United States Patent
Eberling et al.

(10) Patent No.: US 6,758,298 B2
(45) Date of Patent: Jul. 6, 2004

(54) SCHOOL BUS DOOR/SERVICE BRAKE INTERLOCK SYSTEM

(75) Inventors: Charles E. Eberling, Wellington, OH (US); Michael D. Grandstaff, Medina, OH (US)

(73) Assignee: Bendix Commerical Vehicle Systems LLC

(*) Notice: Subject to any disclaimer, the term of this patent is extended or adjusted under 35 U.S.C. 154(b) by 0 days.

(21) Appl. No.: 09/880,306

(22) Filed: Jun. 13, 2001

(65) Prior Publication Data

US 2002/0189882 A1 Dec. 19, 2002

(51) Int. Cl.$^7$ ................................. B60T 7/14
(52) U.S. Cl. ............... 180/272; 180/273; 180/286; 303/6.1
(58) Field of Search .................. 180/268, 273, 180/286, 271, 287, 272, 275; 303/19, 13, 2, 6.1, 9.73, 89, 3

(56) References Cited

U.S. PATENT DOCUMENTS

| | | | |
|---|---|---|---|
| 1,431,477 A | * 10/1922 | Macloskie | 303/6.1 |
| 3,000,459 A | * 9/1961 | Silver et al. | 180/273 |
| 3,456,988 A | * 7/1969 | Gibbons et al. | 303/13 |
| 3,487,451 A | * 12/1969 | Fontaine | 180/273 |
| 3,790,223 A | * 2/1974 | Fontaine | 180/273 |
| 3,830,330 A | * 8/1974 | Fontaine | 180/273 |
| 3,905,651 A | * 9/1975 | Hornung | 303/13 |
| 4,166,513 A | * 9/1979 | Johnson | 180/271 |
| 4,200,167 A | 4/1980 | Cockman, Jr. | |
| 4,572,319 A | * 2/1986 | Fontaine | 180/273 |
| 4,838,617 A | 6/1989 | Deitchman et al. | |
| 4,949,820 A | * 8/1990 | Fontaine et al. | 477/186 |
| 5,520,446 A | * 5/1996 | Wilson et al. | 188/170 |
| 5,533,795 A | * 7/1996 | Brooks | 180/273 |
| 5,572,187 A | * 11/1996 | Williford | 340/454 |
| 5,706,909 A | * 1/1998 | Bevins et al. | 180/273 |
| 5,839,304 A | * 11/1998 | Wills | 180/287 |

* cited by examiner

Primary Examiner—Lesley D. Morris
Assistant Examiner—Daniel Yeagley
(74) Attorney, Agent, or Firm—Calfee, Halter & Griswold LLP

(57) ABSTRACT

A bus door/service brake interlock system having a warning system is provided. The interlock system includes a foot valve assembly to effect a service brake application when warning lights are activated, a vehicle door is open, and minimum speed conditions are met. An auxiliary line is positioned between a source of pressure and the foot valve assembly and includes a valve and a low pressure indicator. Should the operator leave the driver seat with the interlock system engaged, the parking brake is automatically applied.

19 Claims, 1 Drawing Sheet

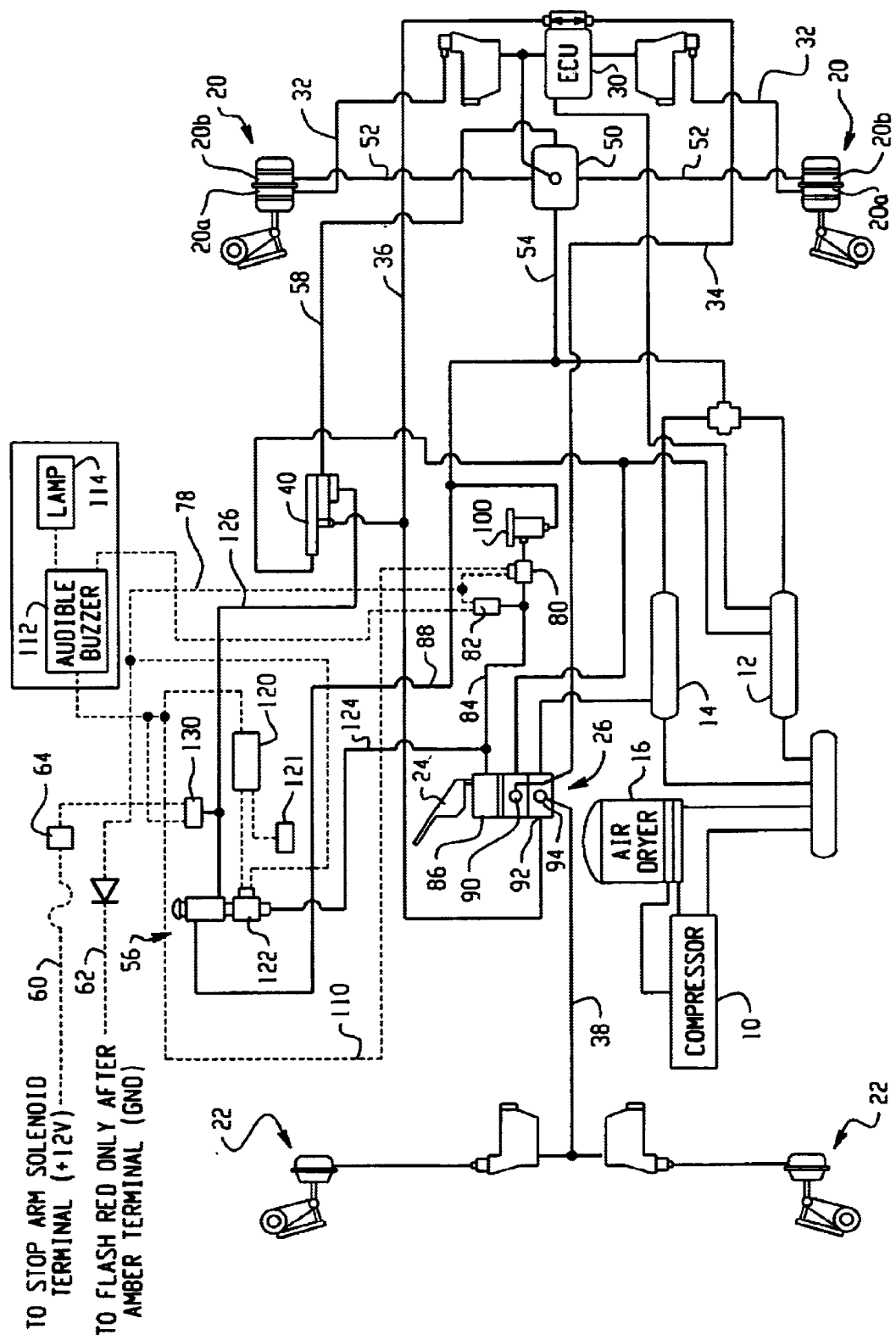

SCHOOL BUS DOOR/SERVICE BRAKE INTERLOCK SYSTEM

BACKGROUND OF THE INVENTION

1. Field of the Invention

This invention relates in general to braking systems and, more particularly, to an interlock system for incorporation as original equipment. This interlock system includes a simple brake control device that provides a braking function when the system is engaged and a failure is detected, is easily installed in the foot valve to simplify installation, and improves failure mode protection.

2. Discussion of the Art

It is known in the industry, for example, as shown and described in U.S. Pat. No. 4,838,617, to interlock brakes with operation of the door. When the door is opened, the brakes are applied and cannot be released while the door remains opened. As taught in U.S. Pat. No. 4,838,617, a solenoid is energized and shifts a plunger to a blocking position in response to a door being opened. A valve maintains pressure in the brake line and prevents release of the brakes even if actuating pressure on the brake pedal is released. Once the door is closed, the solenoid is deenergized and the brakes are released.

Other systems, for example as taught in U.S. Pat. No. 4,200,167, provide an interlock between the door handle of a bus and a series of switches, such as a brake light switch, gear shift, and a driver control switch before the door is permitted to open.

Presently, some state laws require that an operator park a bus during passenger pickup. This necessitates that the operator or driver actuates a park brake, for example, pulling an actuating lever to apply a park brake. Repetitively actuating and deactuating the park brake can cause extreme fatigue to the driver and premature wear of components in the brake system.

The present applicant suggests that a safe course of action can be achieved by urging the driver to stay seated with his foot on the brake pedal during a door open state. In other words, it is not necessary to actuate the park brakes. Instead, it would be desirable to have a system that provides a service brake application as long as the driver remains seated with his foot depressing the foot pedal to effect a normal service brake application.

It is deemed desirable to have the driver cause a service brake application to both the drive and steer axles and be in a position to undertake further action if necessary. It is further desirable to provide a system that monitors certain activities of the driver, e.g., whether the driver is seated or wearing his seat belt. If not, it would be desirable to apply the brakes automatically if the driver exits the seat with the interlock feature actuated. In addition, an alarm or signal is provided if certain requirements are not met.

SUMMARY OF THE INVENTION

The present invention contemplates a new and improved apparatus and method that overcomes the above-referenced problems and others and provides a simple, effective solution which can be integrally incorporated into OEM systems.

More particularly, a simple auxiliary brake control device or interlock assembly is provided so that the service brakes are automatically applied under selected conditions. An alarm associated with a door/service interlock assembly is responsive to application of the brakes under certain circumstances.

The system is activated and deactivated in response to the operator turning on the flashing caution lights and opening the bus door.

A pressure indicator monitors air pressure in an auxiliary line provided between a source of air pressure and a foot valve.

A low-pressure indicator is actuated in response to a no or low-pressure application of the air and activates the applied foot valve feature causing an alarm to alert the operator.

A principal advantage of the invention is realized by urging the driver to stay seated when the auxiliary brake control system is activated (e.g., when caution lights have been turned on and the door opened) so that a normal service brake application is used.

Still another advantage of the invention is the ability to provide increased confidence that results by causing the parking brakes to be automatically set should the operator exit the seat with the system engaged.

Yet another advantage is the reward provided to the driver in disabling the system, including the alarm, if the park brake is applied.

Still other advantages and benefits of the invention will become apparent to those skilled in the art upon a reading and understanding of the following detailed description.

BRIEF DESCRIPTION OF THE DRAWINGS

The FIGURE is a schematic representation of the present invention employed in a vehicle brake system.

DETAILED DESCRIPTION OF THE PREFERRED EMBODIMENT

Turning to the FIGURE, familiarity with a conventional air brake system is presumed, although a brief review of some components is provided to generally describe the environment in which a new bus door/service brake interlock system is used. A compressor 10 selectively charges primary and secondary reservoirs 12, 14 after passing through an air dryer 16 to remove entrained moisture. The compressed air is used to provide selective braking action to a rear or drive axle that includes brake chambers 20a. In addition, a front or steering axle includes brake chambers 22 associated therewith.

A foot pedal 24 operates foot pedal control valve 26 which selectively interconnects compressed air from either the primary or secondary reservoirs to the individual brake chambers 20a, 22 associated with vehicle wheels. An anti-lock brake system (ABS) controller relay assembly including an electronic control unit (ECU) 30 is associated with the service brake chambers 20a associated with the rear brake chambers via lines 32. The foot control valve 26 communicates with the controller relay assembly via line 34. In addition, if the primary circuit control line is inoperative, line 36 associated with the secondary circuit delivers pressure to the control relay assembly 40 to modulate spring brakes associated with the drive axle in a manner known in the art.

A delivery line 38 extends from the control valve to the front brake chambers 22 for applying the service brakes under control of the secondary circuit. Relay valve 50 is in operative communication with the spring brake chamber 20b associated with the park brakes via lines 52. In addition, line 54 provides supply pressure from either the primary or secondary reservoir and park brake valve 56 communicates with the relay valve 40 through line 58. Again, the structure and operation of the brake circuit described to this point is generally conventional so that further discussion herein is deemed unnecessary to a full and complete understanding of the present invention.

The auxiliary brake control device of the present invention controls the primary and secondary brake circuits associated with the vehicle. Particularly, the auxiliary brake control device or interlock assembly is activated by opening a door as represented by lines 60 (+twelve volts), 62 (ground) and when the vehicle minimum speed is met (e.g., about 5 mph or another desired threshold level) as represented by speed switch 64. These events enable the system whenever the parking brakes are released. Thus, if the parking brakes are applied then switch 130 does not activate the interlock assembly since it is unnecessary. However, if the parking brakes are released, a door is opened and a predetermined speed is met, the interlock assembly provides a service brake application to the primary and secondary brake circuits as will be further described below.

When the door/service brake interlock assembly is activated, power is provided through line 78 to a normally closed electro-pneumatic solenoid valve 80 and a low pressure indicator 82 provided in an auxiliary air line 84. The auxiliary line 84 extends between the source of compressed air (reservoirs 12, 14) and a piston actuator 86 associated with the modified foot valve 26, using pressurized air from line 88 that interconnects the park brake valve 56 with the compressed air source. The piston actuator 86 is preferably a piston cylinder assembly incorporated in the foot valve that actuates the foot valve to a service brake apply position to provide pressurized air through delivery ports 90, 92, 94 to both the front and rear axles. More particular details of the modified foot valve, and specifically the piston actuator thereof, can be found in commonly owned U.S. application Ser. No. 09/729,645, filed Dec. 4, 2000. In addition, a pressure reducing valve 100 is provided in the auxiliary line upstream of the electro-pneumatic valve 80 to reduce the air pressure to a desired level prior to delivery to the foot valve 26. Thus when active, the interlock system automatically provides service braking to both the front and rear axles.

If the low-pressure indicator 82 detects a no or low pressure condition, a warning or alarm is provided to the operator. As evident in the FIGURE, the low-pressure indicator 82 is connected via line 110 with an audible buzzer 112 and/or lamp 114. The operator is therefore apprised that, although service braking is expected from the interlock system, sufficient air pressure may not be applied.

In one embodiment, the auxiliary brake control device (interlock assembly) includes the auxiliary air line 84 and the piston actuator 86. As illustrated in the FIGURE, the piston actuator 86 is also included within the foot pedal control valve 26. It is also contemplated, in other embodiments, that the auxiliary brake control device (interlock assembly) also includes the solenoid valve 80, the low pressure indicator 82, the pressure reducing valve 100, the lines 60, 62, and the speed switch 64.

An additional feature of the interlock system is activated if the operator leaves his seat. Particularly, a switch 120 is normally open and closes in response to selected actions of an operator. The switch 120 is closed, for example, if the operator disengages a seat monitoring apparatus 121 (e.g., a seatbelt). Further, the park brake valve 56 is actuated via electro-pneumatic solenoid 122. The solenoid is normally closed but opens in response to activation of the switch 120. In this manner, pressure in line 124 causes the park brake valve to vent air pressure via line 126 to the service relay valve 40 and thereby automatically park the vehicle. Incorporated into the circuit is a switch 130 that disables the interlock system when the parking brake is applied so that the vehicle brakes do not encounter a simultaneous service and parking brake application. Similarly, the switch could be a pressure switch located in the seat that is activated once the operator leaves the seat. Still other types of switches that monitor the actions of the operator and provide an indication that the operator has left the driver's seat will be understood by those skilled in the art.

In summary, a simple auxiliary brake control device controls a brake application to the primary and secondary circuits. The driver is encouraged to remain seated with the foot valve applied and a if the operator leaves his seat with the interlock assembly applied, the parking brakes are automatically applied. If insufficient pressure is provided by the auxiliary brake control, the operator is alerted.

The present invention can be adapted to a wide variety of original equipment manufacturer ("OEM") arrangements and does not require a high technical level of the air system.

The invention has been described with reference to the preferred embodiment. Modifications and alterations will occur to others upon reading and understanding this detailed specification. It is intended to include all such modifications and alterations in so far as they come within the scope of the appended claims and equivalents thereof. It should also be appreciated that the invention should be defined by the claims and not limited to all or any specific one of the advantages and benefits described herein.

We claim:

1. An auxiliary brake control device for controlling primary and secondary brake circuits associated with a vehicle, comprising:

a source of air pressure;

a primary brake circuit;

a secondary brake circuit;

a foot valve assembly for selectively delivering pressure to the primary and secondary brake circuits;

an auxiliary line communicating an auxiliary pressure to the foot valve assembly;

an interlock assembly, including a piston actuator positioned within the foot valve assembly and communicating with the auxiliary line, the piston actuator being selectively actuated via the auxiliary pressure to provide supply pressure to the foot valve assembly and thereby deliver pressure to the primary and secondary brake circuits in response to opening a vehicle door; and a pressure indicator monitoring the auxiliary pressure.

2. The invention of claim 1, further comprising:

a switch that is activated to apply a parking brakes if a seat monitoring apparatus indicates an operator is not in a driver seat and the interlock assembly is actuated.

3. The auxiliary brake control device of claim 1, further including:

an on/off switch for selectively activating and deactivating the piston actuator to provide the supply pressure to the foot pedal.

4. The auxiliary brake control device of claim 1, further including:

an alarm.

5. The auxiliary brake control device of claim 4, wherein the alarm includes an audible buzzer.

6. The auxiliary brake control device of claim 4, wherein the alarm includes a visible lamp.

7. The auxiliary brake control device of claim 1, wherein the pressure indicator causes an alarm signal to be transmitted to an alarm if the auxiliary pressure drops below a predetermined level.

8. The auxiliary brake control device of claim 1, wherein the interlock assembly further includes a pressure reducing valve located in the auxiliary line.

9. The auxiliary brake control device of claim 1, wherein the interlock assembly further includes a switch that inactivates the interlock assembly once the parking brakes are actuated.

10. An interlock assembly for a bus having a supply of compressed air and air-actuated brakes associated with wheels of the bus, the interlock assembly comprising:

a piston actuator;

a valve for supplying compressed air to the piston actuator in response to opening a bus door, the piston actuator causing a foot pedal control valve to apply the brakes of the associated wheels when actuated by the compressed air; and a pressure sensor operatively interconnected with the valve for monitoring air delivery to the piston actuator.

11. The interlock assembly of claim 10 wherein the piston actuator is included in the foot pedal control valve.

12. The interlock assembly of claim 10 further comprising an indicator to the operator that the vehicle operator has left his seat.

13. The interlock assembly of claim 10 further comprising a pressure reducing valve disposed adjacent the valve to limit pressure thereto.

14. The interlock assembly of claim 10 further comprising a switch actuated in response to a condition indicating a vehicle operator has left his seat when the interlock assembly is active and a park brake valve adapted to apply park brakes associated with the wheels.

15. The interlock assembly of claim 10 wherein the valve is an electropneumatic solenoid valve.

16. A method of controlling brake function to primary and secondary brake circuits when a door is open below a preselected speed, the method comprising the steps of:

providing air pressure to a piston actuator, included in a foot valve, in response to a door open condition below a preselected speed;

applying service brakes as a function of the air pressure provided to the piston actuator; and monitoring the air pressure provided to the piston actuator.

17. The method of claim 16 further comprising:

actuating a parking brake of the vehicle if an operator leaves his seat.

18. The method of claim 16 further comprising:

if the air pressure provided to the piston actuator drops below a predetermined level, providing an alarm to an operator.

19. The method of claim 16 further comprising:

monitoring whether an operator is located in the driver seat of a vehicle when a door is open below a preselected speed; and actuating a parking brake if the operator leaves his seat.

* * * * *

UNITED STATES PATENT AND TRADEMARK OFFICE
CERTIFICATE OF CORRECTION

PATENT NO. : 6,758,298 B2
DATED : July 6, 2004
INVENTOR(S) : Charles E. Eberling et al.

It is certified that error appears in the above-identified patent and that said Letters Patent is hereby corrected as shown below:

<u>Column 4,</u>
Line 13, please delete "a"
Line 51, please delete "brakes" and insert -- brake --

Signed and Sealed this

Ninth Day of November, 2004

JON W. DUDAS
*Director of the United States Patent and Trademark Office*